(12) United States Patent
Guering

(10) Patent No.: US 7,909,287 B2
(45) Date of Patent: Mar. 22, 2011

(54) SUPER-TRANSPORTER AIRCRAFT

(75) Inventor: Bernard Guering, Montrabe (FR)

(73) Assignee: Airbus France, Toulouse (FR)

( * ) Notice: Subject to any disclaimer, the term of this patent is extended or adjusted under 35 U.S.C. 154(b) by 254 days.

(21) Appl. No.: 11/792,759

(22) PCT Filed: Nov. 24, 2005

(86) PCT No.: PCT/FR2005/050990
§ 371 (c)(1), (2), (4) Date: Jun. 8, 2007

(87) PCT Pub. No.: WO2006/061531
PCT Pub. Date: Jun. 15, 2006

(65) Prior Publication Data
US 2007/0262196 A1    Nov. 15, 2007

(30) Foreign Application Priority Data

Dec. 9, 2004  (FR) .................................... 04 52911

(51) Int. Cl.
B64C 1/22 (2006.01)
B64D 5/00 (2006.01)

(52) U.S. Cl. ................ 244/118.2; 244/118.1; 244/137.1

(58) Field of Classification Search ............... 244/118.1, 244/118.2, 120, 119, 4 R, 137.1, 2, 13, 159.4, 244/159.5, 159.6, 140; 248/499, 503; 410/48
See application file for complete search history.

(56) References Cited

U.S. PATENT DOCUMENTS

| | | | | |
|---|---|---|---|---|
| 2,294,003 | A | * | 8/1942 | Scheufele .................. 244/118.2 |
| 2,387,527 | A |   | 10/1945 | Nagamatsu |
| 2,388,380 | A | * | 11/1945 | Bathurst ..................... 244/118.2 |
| 2,448,862 | A | * | 9/1948 | Conklin ...................... 244/118.2 |
| 2,689,696 | A | * | 9/1954 | Gannon ...................... 244/118.2 |
| 2,780,422 | A | * | 2/1957 | Maglio, Jr. ......................... 244/2 |
| 3,972,492 | A |   | 8/1976 | Milne et al. |
| 4,379,533 | A | * | 4/1983 | Caldwell et al. ........... 244/118.1 |
| 5,356,097 | A | * | 10/1994 | Chalupa ........................ 244/139 |
| 5,435,504 | A | * | 7/1995 | Inoue et al. ..................... 244/13 |
| 7,261,257 | B2 | * | 8/2007 | Helou, Jr. ................... 244/118.1 |
| 2004/0135031 | A1 |   | 7/2004 | Stupakis |

FOREIGN PATENT DOCUMENTS

FR          2 783 495          3/2000

* cited by examiner

Primary Examiner — Tien Dinh
Assistant Examiner — Richard R Green
(74) Attorney, Agent, or Firm — Patterson Thuente Christensen Pedersen, P.A.

(57) ABSTRACT

A super-transporter aircraft for transporting at least one element of a secondary aircraft, wherein the structural rigidity of a fuselage of the super-transporter is at least partly imparted by the transported element. The super-transported aircraft can be equipped with a securing device for securing the transported element to the fuselage of the super-transporter aircraft, the securing device adapted to pick up the loads to which the super-transporter aircraft is subjected.

7 Claims, 4 Drawing Sheets

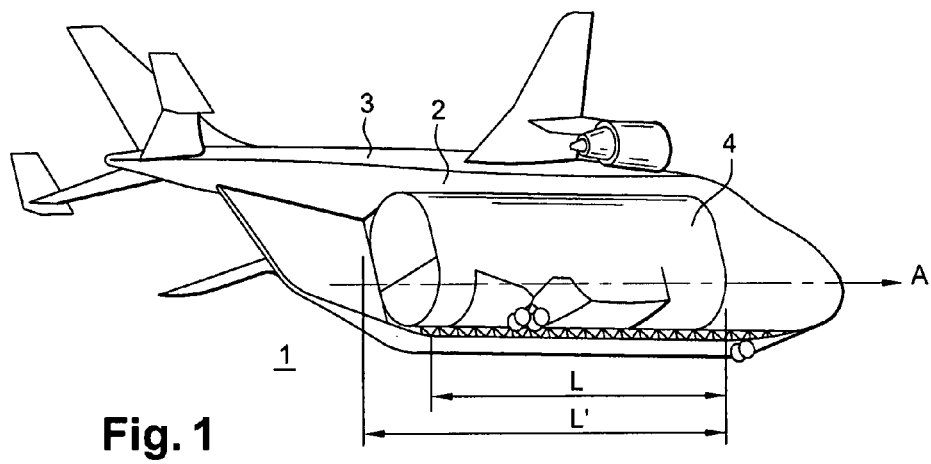
Fig. 1
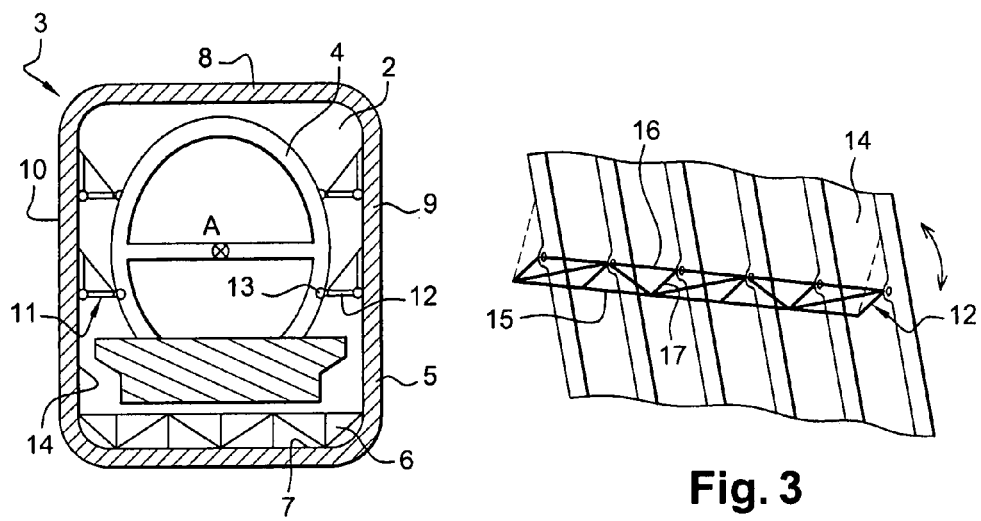
Fig. 2
Fig. 3

SUPER-TRANSPORTER AIRCRAFT

RELATED APPLICATIONS

This application claims priority to PCT Application No. PCT/FR2005/050990 filed Nov. 24, 2005, and French Application No. 0452911 filed Dec. 9, 2004, the disclosures of which are hereby incorporated by reference in their entirety.

TECHNICAL FIELD

The invention relates to a super-transporter aircraft which can be used, particularly, for transporting parts of a secondary aircraft or more generally for transporting a large consignment, in a cargo hold. A secondary aircraft is herein understood to be an aircraft of a smaller size than that of the super-transporter aircraft.

The super-transporter aircraft according to the invention is for use within the field of aircraft construction, by permitting the gathering together, at a same assembly site, of the various parts of a secondary aircraft which have been manufactured at different geographic locations. The parts of a secondary aircraft are herein understood to mean the various parts of the aircraft, such as a cockpit, fuselage sections, wings or engines, etc.

BACKGROUND ART

The manufacture of an aircraft requires, depending on the part being made, multiple, particularly technical competencies and means. Also, the manufacture of an aircraft is usually carried out in a sequential manner, at different construction sites which can be several thousand kilometers apart. The wings may be built at one given site, while only the fuselage sections, etc., are made at another site. The final step of assembling all these aircraft parts requires that they are all brought together at the same assembly site. It is therefore necessary to transport these various parts of the aircraft, after their manufacture, to the assembly site.

For a number of years, the transporting of these aircraft parts by shipping routes, road or railways, has been abandoned in favor of air transportation. In order to do this, super-transporter aircraft have been developed. A particularly known super-transporter aircraft is derived from the AIRBUS A300-600R aircraft. A cargo hold of such a super-transporter aircraft has a diameter of about 7.4 meters and a length of about 37.7 meters, permitting the transport of a load in excess of 45 tons. A cargo hold is understood herein to mean a cargo zone within the super-transporter aircraft, in which the part of the secondary aircraft to be transported is stowed.

One disadvantage of such a super-transporter aircraft is its empty weight. The empty weight is herein understood to mean the weight of the super-transporter aircraft when the cargo hold is not carrying freight. The empty weight, therefore, represents the intrinsic weight of the super-transporter aircraft.

The super-transporter aircraft has a heavy empty weight particularly due to the quantity of materials required for its construction. The weight of the part destined for transportation can attain several dozen tons. The weight of the transported part is, therefore, added to the empty weight of the super-transporter aircraft. A total weight, super-transporter aircraft plus cargo, can therefore reach several hundreds of tons. The super-transporter aircraft uses a large amount of fuel during the transportation of the secondary aircraft part.

Therefore, cost of transporting secondary aircraft parts by air is significant.

Moreover, the super-transporter aircraft does not have a large flying range. When it needs to travel long distances, the super-transporter aircraft often needs to make at least one stop-over for refueling.

SUMMARY OF THE INVENTION

One of the aims of the invention is to create a light empty weight super-transporter aircraft. A light weight is herein understood to mean that the empty weight of a super-transporter aircraft is, for example, less than the weight of cargo destined for transportation. A light weight is also herein understood to mean, for example, a weight that is less than that of an aircraft of the same size and destined for the same use. Another aim of the invention is to create a super-transporter aircraft which has a volume capacity for cargo which can be greater, in places, than the volume of the super-transporter aircraft fuselage and thus permits the transportation of large loads.

To achieve this, within the invention, account is taken of the physical and mechanical properties of the secondary aircraft parts destined to be transported by the super-transporter aircraft. A secondary aircraft is herein understood to be any craft which can sustain itself in the atmosphere by a reaction to air other than a reaction to the air on the earth's surface. A secondary aircraft could therefore be an aeroplane, a rocket or a missile, etc. In effect, the secondary aircraft parts which are destined, once assembled, to form an aircraft, all have their own aerodynamic properties allowing them to withstand, in particular, the effects of pressure and compression to which the aircraft is subjected when flying.

Thus, the super-transporter aircraft according to the invention can be at least partially without, when empty, structural rigidity and therefore the aerodynamic properties required for flying, but acquire these properties, once loaded, due to the presence of the transported part. At least partially is herein understood to mean that the fuselage of the super-transporter aircraft is without the aerodynamic properties at least within the cargo hold, at least in a dismantled state, that is to say empty, in which the reinforcements of the cargo hold are dismantled, ready for the reception of a new load. These reinforcements can be attached to the load to give rigidity. The cargo is therefore part of the structural strength of the super-transporter aircraft. This permits a reduction in the quantity of materials required for the construction of the super-transporter aircraft, particularly in respect of a layer of the fuselage casing.

These reinforcements can also be fixed to a structure for empty transport, in order to confer a sufficient rigidity on the super-transporter aircraft so that it can be allowed to fly when empty.

It is possible, in order to optimize cooperation between the super-transporter aircraft and the cargo, to adapt the super-transporter aircraft specifically to the secondary aircraft part to be transported. In effect, depending on the secondary aircraft parts, a variable size, weight or tolerance etc., can require specific adjustments to the super-transporter aircraft. Cooperation is herein understood to mean that the load, or cargo, contributes to the structural strength of the super-transporter aircraft, in particular by conferring upon it a sufficient rigidity for the flight.

The aim of the invention is therefore to create a super-transporter aircraft for transporting at least one part of a secondary aircraft characterized in that it includes rigidifying means so that structural rigidity of a super-transporter aircraft fuselage is conferred, at least partially, by the transported part.

The super-transporter aircraft according to the invention can also include all or some of the following additional characteristics: the rigidifying means are fitted with an integrating device for integrating the transported part with the fuselage of the super-transporter aircraft, the integrating device capable of absorbing the stresses to which the super-transporter aircraft is subjected; the integrating device includes at least two ladders which are integral to an internal wall of the super-transporter aircraft's fuselage, and multiple means for fastening, a first extremity of a means for fastening integral with a ladder, a second extremity of the means for fastening destined to be fixed to the transported part; at least one ladder is capable of having two respective stable positions, a loading position in which the ladder follows the contour of the inside wall of the fuselage, and an operational position in which the ladder extends by protruding from the internal wall of the fuselage, towards the interior of the super-transporter aircraft fuselage; the means for fastening are telescopic; the transported part is a fuselage section of the secondary aircraft, the second extremity of the means for fastening cooperates with a cavity which forms an emplacement for a porthole of the fuselage section of the secondary aircraft; and/or the transported part is a half-wing.

BRIEF DESCRIPTION OF THE DRAWINGS

The invention will be more easily understood when reading the following description and studying the accompanying drawings. These are presented as an indication of the invention and are not limitative. The figures represent:

FIG. 1 is a schematic representation of a super-transporter aircraft and of a cargo in the form of a fuselage section of a secondary aircraft, according to one example of an embodiment of the invention.

FIG. 2 is a cross section of FIG. 1 representing, at the site of a cargo hold of the super-transporter aircraft.

FIGS. 3 to 5 are schematic representations of the integrating devices of a secondary aircraft part to be transported in the cargo hold of a super-transporter aircraft according to the embodied examples of the invention.

DETAILED DESCRIPTION OF THE DRAWINGS

Figure 6:
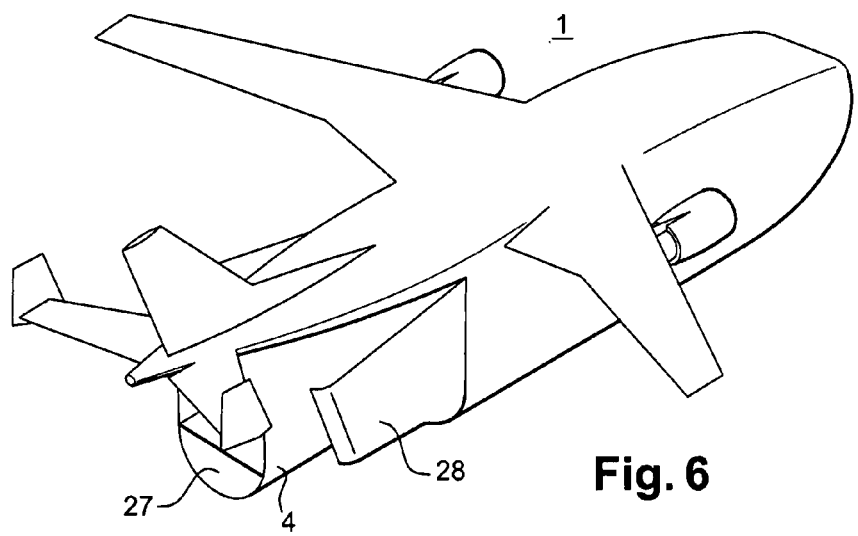
FIG. 6 is a side view of the super-transporter aircraft of FIG. 1.

FIG. 1 is a representation of a super-transporter aircraft 1. A cargo hold 2, situated on the inside of a fuselage 3, transports a fuselage section 4 of a secondary aircraft. A length L of section 4 is less than a length L' of the cargo hold 2. L or L' is herein understood to mean the dimension of the section 4 or of the cargo hold 2 along the longitudinal axis A of the cargo hold 2, so that the section 4 is entirely contained within the internal volume of the cargo hold 2. It is also possible to transport a secondary aircraft part having a length that is greater than the length L' of the cargo hold 2, as is described by the following (FIG. 6).

FIG. 2 shows a cross section of the super-transporter aircraft 1 at the site of the cargo hold 2. A wall 5 of the fuselage 3 at the site of the cargo hold 2 is at least partially without structural rigidity. In its empty state, the super-transporter aircraft 1 is not able to withstand the stress of pressure and compression which is exerted against the wall 5 of the fuselage 3 when flying. The structural rigidity necessary in order for the super-transporter 1 to be allowed to fly is conferred by the fuselage section 4 of the secondary aircraft that the super-transporter aircraft 1 is transporting. As is represented in FIG. 2, a provision can be made for recess 6 to the wall 5 at the site of a base 7 of the cargo hold 2.

A base 7 is herein understood to mean the section of the cargo hold 2 which forms a floor of the fuselage 3, on which the part for transporting is destined to sit. The base 7 must bear a load of a weight that can reach several dozen tons. It may therefore be necessary to confer a structural rigidity to the cargo hold 2 itself, at the site of the base 7, such that the wall 5 at the site of the base 7 does not buckle, or give way, once the cargo hold 2 is loaded. On the other hand, at the site of a roof 8 and of the side walls 9 and 10, the materials which are used to form a frame and/or a thickness of the frame are insufficient to ensure a structural rigidity, at least during flight, to the fuselage 3. A frame is herein understood to mean the framework of the super-transporter aircraft 1, in other words the different panels which form the super-transporter aircraft 1. The cargo, consisting in this example of a fuselage section 4, has a structural rigidity which is sufficient for conferring to the super-transporter aircraft 1 the rigidity required for flying.

The fuselage section 4 is docked into the cargo hold 2 by an integrating device 11 which is able to absorb the stresses to which the super-transporter aircraft 1, as well as the section 4, are subjected during flight. The integrating device 11 also prevents any displacement of the section 4 inside the cargo hold 2.

As it is possible to see in greater detail further on, once the super-transporter aircraft 1 is to be used in an empty state, for example for returning it to its base after transporting a fuselage section 4, it is possible to confer to the super-transporter aircraft 1 a sufficient rigidity for it to be able to fly, through the use of empty transport structures 29 (FIG. 9), integral to the integrating device 11.

In the example depicted in FIG. 2, the integrating device 11 is formed of four ladders 12 and a means for fastening 13. The ladders 12 are integral with an internal face 14 of the side walls 9 and 10 and are placed two by two on each one of the side walls 9 and 10. The two ladders 12 situated on a same side wall 9 or 10 are placed one under another, an axis of each ladder 12 along the longitudinal axis A of the cargo hold 2. The ladders 12 extend by protruding from the interior wall 14 of the fuselage 3, towards the fuselage section 4 of the secondary aircraft, in such a way that the means for fastening 13 can be attached to the fuselage section.

FIG. 3 represents a ladder 12 which is integral with the internal face 14 of the side walls 9 or 10 of the fuselage 3 of the super-transporter aircraft 1. The supports 15 and 16 of the ladder 12 lie along the longitudinal axis A of the super-transporter aircraft 1, and the connector rods 17 form the resistant mechanical liaison between the two supports 15 and 16.

In one particular example of an embodiment of the invention, all or part of the ladders 12 of the integrating device 11 can have two stable positions. In a first position, or loading position (not shown), the ladder 12 does not extend by protruding from the walls 9 or 10, but, on the contrary, follows the contour of the walls 9 or 10, in such a way as to lessen obstruction by the ladder 12 in the cargo hold 2. The loading position therefore permits the easier introduction of the fuselage section 4, or of all other elements destined to be transported by the super-transporter aircraft 1, in the cargo hold 2. In effect, the section 4 will not abut against the ladder 12 during loading, or damage the ladder 12. Once the loading is done, the ladder 12 is put into a second stable position, or operational position, in which it extends by protruding from the walls 9 or 10 (FIGS. 2 and 3). In the loading position, the means for fastening 13 can be attached to the section 4. It is possible for the passage to move from one stable position to the other, by swinging, or turning, around one of the supports 15 or 16 integral to the internal face 14 of the walls 9 or 10.

In one embodiment, it is possible to ensure that only the ladders 12 situated on one of the two side walls 9 or 10 can have the two stable positions, while the ladders 12 situated on the opposite side walls 9 or 10 are kept permanently in the operational position. It is also possible to ensure that all of the ladders 12 can have both of these stable positions.

Figure 4:
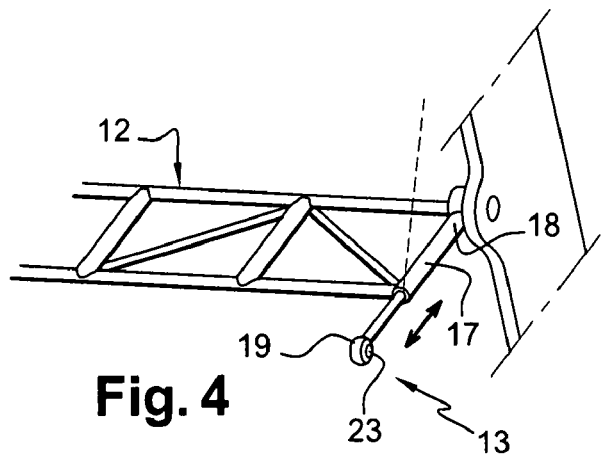

FIG. 4 shows an example of an embodiment of a means for fastening 13. A first extremity 18 of the means for fastening 13 is integral to the ladder 12. A second extremity 19 of the means for fastening 13, or free extremity, extends by protruding from the ladder 12, towards the part for transporting. The second extremity 19 of the means for fastening 13 can be attached in a reversible way to the part for transporting, in order to dock the part for transporting into the cargo hold 2.

In the example represented in FIG. 4, the means for fastening 13 is telescopic. The means for fastening 13 is thus able to slide into a hollow cylindrical body of one of the connector rods 17 of the ladder 12.

The use of telescopic means for fixing 13 makes it possible to reduce obstruction by the integrating device 11 when it is not being used. In effect, in this case, the means for fastening 13 can be entirely contained in the connector rods 17 of the ladder 12. Moreover, such telescopic means for fixing 13 permit the integrating device 11 to adapt to different volumes and different shapes of loads, because the telescopic means for fixing 13 can be extended more or less outside of the connector rods 17 in order to come into contact with the part for transporting to which they must be attached.

The means for fastening 13 can be attached in different ways to the part for transporting. Particularly, an attachment of the means for fastening 13 can vary according to the nature of the part of the secondary aircraft for transporting.

Figure 5A:
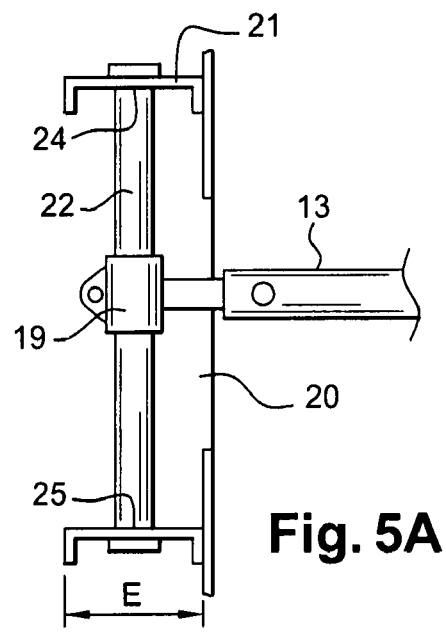

FIG. 5A shows a first example of attaching a means of fixing 13 to the fuselage section 4 of a secondary aircraft.

The means for fastening 13 crosses a cavity 20 set in a layer E of a wall 21 of the fuselage section 4. The cavity 20 can be adapted, subsequently, to form a porthole in the section 4. The free end 19 of the means for fastening 13 is situated in the thickness E of the wall 21 of the fuselage section 4, that is to say that the means for fastening 13 only partially crosses the thickness E. The free end 19 has an orifice 23 (FIG. 4) which is crossed by a pin 22. The pin 22 lies along the longitudinal axis A of the cargo hold 2. Each extremity 24 and 25 of the pin 22 crosses the thickness E of the wall 21 of the section 4, in such a way that the ends 24 and 25 of the pin 22 are situated on each side of the cavity 20. The pin 22 can therefore be kept in place by all the means in place in the layer of the wall 21.

Figure 5B:
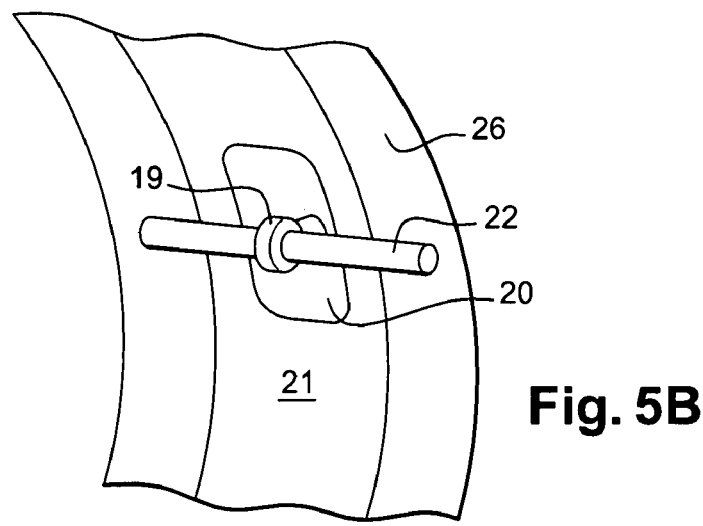

FIG. 5B shows another example of an embodiment of attaching a means for fastening 13 to the fuselage section 4 of a secondary aircraft. The free end 19 of the fastening device 13 penetrates the cavity 20 adapted to form a porthole. The pin 22 extends noticeably parallel to the ladder 12 (not shown) in such a way as to abut against an internal face 26 of the wall 21 of the fuselage section 4 of the secondary aircraft which surrounds the cavity 20.

By using the cavities 20 which are adapted to form portholes of the fuselage section 4, different anchoring or docking points are provided for the fuselage section 4 on the internal wall 14 of the cargo hold 2 of the super-transporter aircraft 1. Thus, on a fuselage section 4 of the secondary aircraft, there can, for example, be ten anchoring points formed by ten cavities 20 adapted to form ten portholes.

Of course, it is also possible to use other parts of the fuselage section 4 for attaching the means for fastening 13. It is also possible to fit the attaching elements onto the fuselage section 4, in order to attach the means for fastening 13, the means for attaching able to be removed after the transporting.

FIG. 6 shows the super-transporter aircraft 1 of the invention carrying a fuselage section 4. A length L of the section 4 is strictly greater than a length L' of the cargo hold 2 of the super-transporter aircraft 1. Also, a rear end 27 of the section 4 is situated on the outside of the cargo hold 2. Rear end is herein understood to mean the extremity opposite a cockpit of the super-transporter 1. A rear end 28 of the super-transporter aircraft 1, at the site of the cargo hold 2, is open in such a way that the section 4 can extend towards the outside. Such a solution allows for the transporting of very voluminous parts of a secondary aircraft.

The higher the number of sections required for creating a fuselage, the more difficult it is to obtain the structural rigidity of the assembled fuselage. In effect, because of the large number of small sections which are joined together to form the fuselage of a secondary aircraft, the fuselage can have a certain fragility in the areas of the joining zones, and this fragility can present a risk to safety of use. With the solution presented in FIG. 6, it is no longer necessary to divide the fuselage of a secondary aircraft into a multitude of small sized sections, thus resolving the problem of rigidity described herein above.

Figure 9:
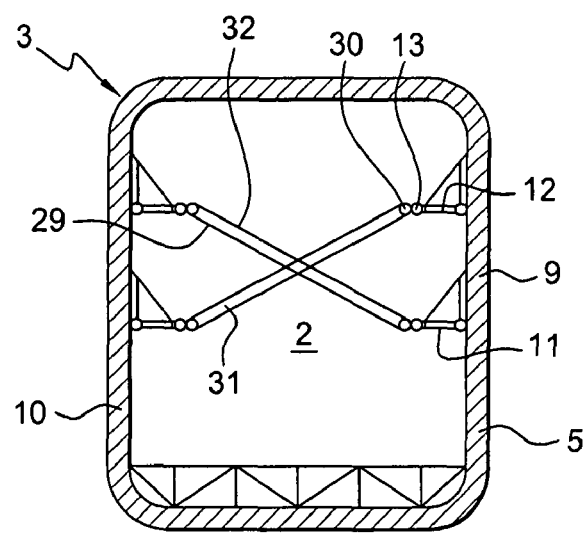
FIG. 9 is a cross-section of FIG. 1, at the site of an empty cargo hold of a super-transporter aircraft.

FIG. 9 shows a cross-section of the super-transporter aircraft 1 at the site of the cargo hold 2 which is empty, in other words not loaded with a secondary aircraft part for transporting. The rigidity is therefore conferred by a plurality of braces 29 integral with the ladders 12 (a single brace 30 is shown on FIG. 9). The braces 29 are, for example, made of hardened steel. Each brace 29 is formed by two axes 31 and 32 positioned at around 100, +/−50°, according to the distance separating two ladders 12 situated on the same side 9 or 10 of the fuselage 3. Each extremity 30 of the axes 31 and 32 is integral with a means for fastening 13 of a ladder 12. The number of braces 29 used can vary according to the length L' of the cargo hold 2, in the capacity of each brace to absorb stress, etc.

In an example of a particular embodiment of the braces 29, the braces are articulated in such a way as to take two different stable positions. In the first stable position, the axes 31 and 32 are separated by an angle of about 100°. In the second stable position, on the contrary, the axes 31 and 32 extend parallel to each other, in such a way as to form only a double axe. Thus, obstruction caused by the braces 29 in the second stable position is minimal, thus facilitating their transport in the super-transporter aircraft 1 when it is transporting the fuselage section 4.

Figure 7:
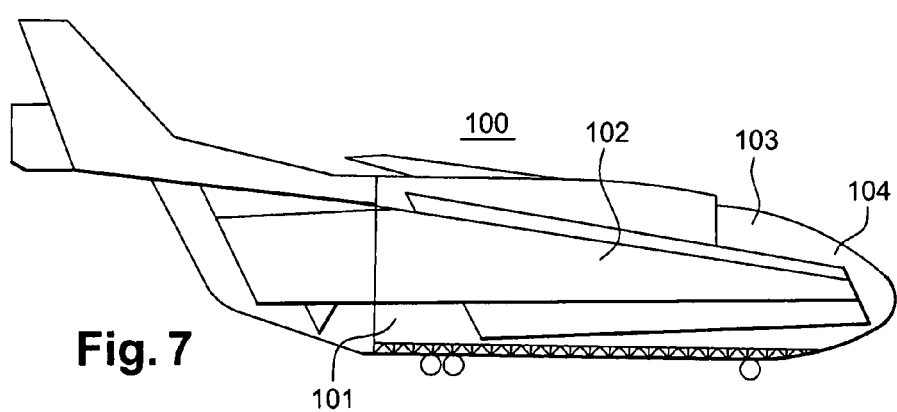
FIG. 7 is a schematic representation of a super-transporter aircraft and of cargo in the form of a wing section of a secondary aircraft, according to one example of an embodiment of the invention.

FIG. 7 represents a super-transporter aircraft 100 which has a cargo hold 101 carrying a half-wing 102. The half-wing 102 extends over the whole length of the cargo hold 101. In this example embodiment, a cockpit 103 is situated on top of a fuselage 104, and not in an extension of the fuselage 104 as is generally the case in an aircraft, in order to optimize the length of the cargo hold 101. Thus, the possible length of a load that the cargo hold 101 can contain is also increased.

Figure 8:
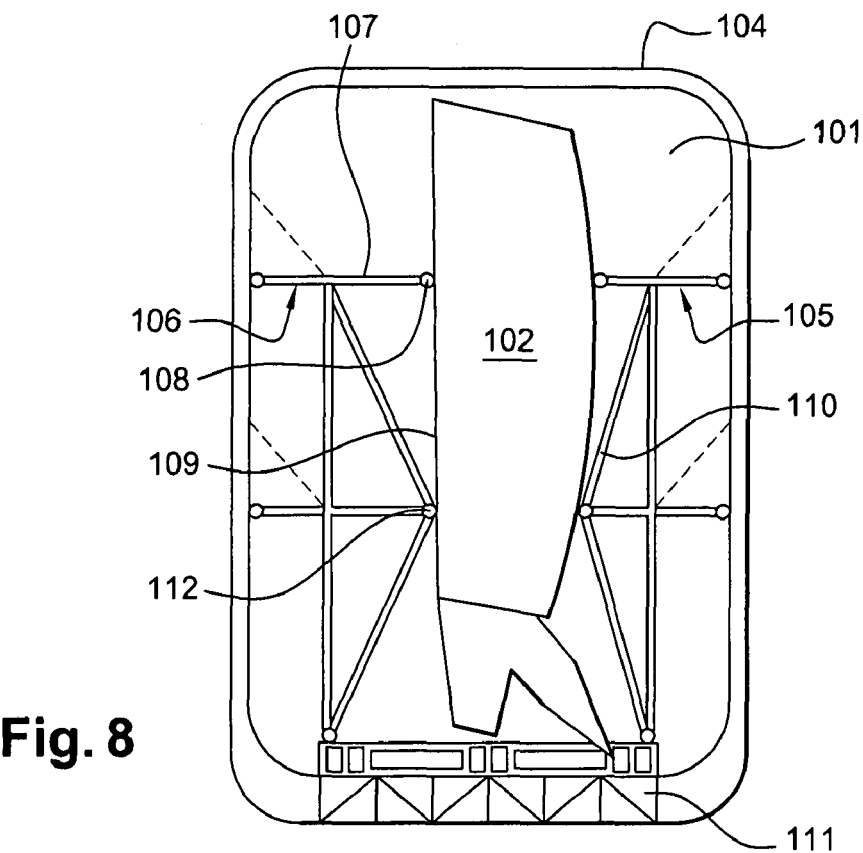
FIG. 8 is a cross-section of FIG. 7, at the site of a cargo hold of the super-transporter aircraft.

FIG. 8 shows a cross-section of FIG. 7. The wing 102 is kept in position in the cargo hold 101 using the means of an integrating device 105.

The integrating device 105 is fitted with 4 ladders 106 and the means for fastening 107. The means for fastening 107 are integral in one part with the ladders 106 and in another part with the half-wing 102. The free extremities 108 of the means for fastening 107, adapted to be fixed to the half-wing 102, are, for example, fixed on the half-wing 102 using handling points 112 on the external surface 109 of the half-wing 102.

It is possible to reinforce the integrating device 105 using a reinforcing tool 110. The reinforcing tool 110 permits the prolongation of a docking between the integrating device 105 and the half-wing 102 up to a base 111, or floor, of the cargo hold 101 of the super-transporter aircraft 100. Moreover, as described in the previous examples, the floor 111 of the cargo hold 101 can be reinforced in order for it to be able to bear the weight of the wing 102.

According to one scale of the half-wing 102, it is possible to transport in the cargo hold 101 the half-wing 102 without its leading edge (FIG. 8). The leading edge can be transported separately, by itself or with other small parts of the secondary aircraft. Each half-wing 102 is assembled with a corresponding leading edge during the assemblage of the secondary aircraft.

The invention claimed is:

1. A super-transporter aircraft for transporting at least one part of a second aircraft, the super-transporter aircraft comprising:
    a fuselage adapted to transport the at least one part at least partially within an interior of the fuselage; and
    an integrating assembly adapted to dock the at least one part to the fuselage of the super-transporter aircraft and to absorb stresses to which the super-transporter aircraft is subjected, the integrating assembly including—
        at least two ladders operably coupled to an internal wall of the fuselage,
        a plurality of fastening members, a first end of each of the plurality of fastening members extending from one of the at least two ladders, and a second, generally opposing end of each of the plurality of fastening members adapted to be fastened to the at least one part,
        a structural reinforcement member selectively engageable with the second end of each of the plurality of fastening members,
    wherein the fuselage is configurable between an empty configuration in which the at least one part of the second aircraft is not loaded within the fuselage and the second end of each of the plurality of fastening members of the integrating assembly is coupled to the structural reinforcement member such that a structural rigidity required for flight is conferred at least partially by the structural reinforcement member, and a transporting configuration in which the second end of each of the plurality of fastening members of the integrating assembly is free of the structural reinforcement member and is coupled to the at least one part such that the structural rigidity is conferred at least partially by the at least one part of the second aircraft.

2. The super-transporter aircraft according to claim 1, wherein the fastening members are telescopic.

3. The super-transporter aircraft according to claim 1, wherein the part of the second aircraft comprises a fuselage section.

4. The super-transporter aircraft according to claim 3, wherein the second end of at least one of the plurality of fastening members is adapted to cooperate with a cavity forming an emplacement for a fuselage section porthole of the second aircraft.

5. The super-transporter aircraft according to claim 1, wherein the part of the second aircraft comprises a half-wing.

6. The super-transporter aircraft according to claim 1, wherein the fuselage is further configurable into a loading configuration between the empty configuration and the transporting configuration, in which the at least one part of the second aircraft is loaded into the fuselage of the super-transporter aircraft.

7. The super-transporter aircraft according to claim 6, wherein at least one of the at least two ladders is shiftable between two respective stable positions during the loading configuration, a loading position in which the ladder extends generally parallel to the internal wall of the fuselage and follows a contour of the internal wall of the fuselage, and an operational position in which the ladder extends generally radially from the internal wall of the fuselage towards the interior of the fuselage of the super-transporter aircraft.

* * * * *